Figure 1:
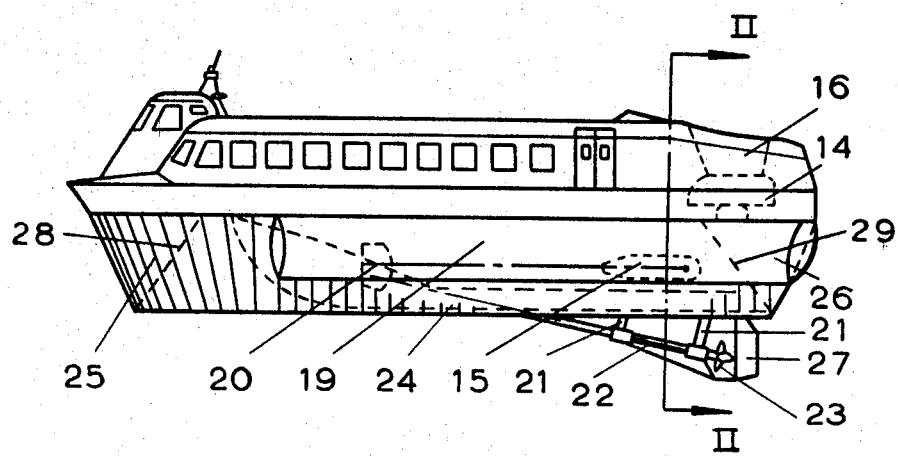

United States Patent

[11] 3,566,822

[72] Inventor Peter Rowland Crewe, Newport, England
[21] Appl. No. 794,225
[22] Filed Jan. 27, 1969
[45] Patented Mar. 2, 1971
[73] Assignee British Hovercraft Corporation Limited, Yeovil, England
[32] Priority Feb. 16, 1968
[33] Great Britain
[31] 7677/68

[54] AIR CUSHION VEHICLES
5 Claims, 2 Drawing Figs.
[52] U.S. Cl. .................. 114/67
[51] Int. Cl. .................. B63b 1/38
[50] Field of Search .................. 114/67.1; 180/127

[56] References Cited
UNITED STATES PATENTS
| | | | |
|---|---|---|---|
| 3,070,327 | 12/1962 | Dornier et al. | 114/67 |
| 3,398,712 | 8/1968 | Hardy et al. | 114/67 |
| 3,430,725 | 3/1969 | Nicholas | 180/127 |

Primary Examiner—Andrew H. Farrell
Attorney—Larson, Taylor & Hinds

ABSTRACT: A vehicle for operating over water supported by air cushions and having a central hull to divide the air cushion area and to provide a low location for a prime mover and power transmission system. The hull provides additional buoyancy and is shaped to provide planing lift. The air cushion area is bounded partly by rigid members and partly by a flexible skirt assembly. The rigid members include ducts to conduct pressurized air to the air cushion and have on their outer sides inflated flexible members which give additional buoyancy and protection against wave impact caused by high seas.

PATENTED MAR 2 1971  3,566,822

AIR CUSHION VEHICLES

This invention relates to maritime vehicles which, during operation, receive support from one or more cushions of pressurized air.

When a vehicle operates over the sea its performance may be limited by the sea state. The sea state is more restrictive to smaller vehicles both in respect of stability and in respect of damage done by waves to the vehicle structure. Severe sea conditions frequently prevent a moderately sized air cushion supported vehicle from operating at its most advantageous speed, and it is an object of the invention to provide a moderate sized air cushion supported vehicle in which the limitations imposed by rough sea conditions are reduced.

According to the invention I provide a maritime vehicle which, during operation, receives support from at least one cushion of pressurized air and additional support from at least one buoyant planing hull, the lateral boundary of the air cushion being bounded in part by downwardly extending rigid members and in part by a flexible skirting assembly, and including flexible inflatable members secured to the sides of the rigid members remote from the air cushion.

Whilst referring to air as the supporting medium it is to be understood that any suitable fluid may be used.

The downwardly extending rigid members may extend longitudinally along at least part of the sides of the vehicle and may serve as ducts for supplying pressurized air to the air cushion.

The flexible skirting assembly may be of the form disclosed in British Pat. No. 952,772, and preferably may take the form of independent corrugations, as claimed in claims 5 to 20 of that specification. Such independent members have become known in the art as segments.

The downwardly extending rigid members, together with inflated flexible members and a plurality of independent segments, may form part of the boundary at the sides of the vehicle. The remainder of the lateral boundary may include a plurality of independent segments depending from the structure of the vehicle and having lengths such that their lower tips form a substantially even hemline with the hereinbefore mentioned boundary at the sides of the vehicle.

A single rigid buoyant hull may be situated about the longitudinal centerline of the vehicle to subdivide the fluid cushion area. The hull may be shaped and arranged to provide planing lift at the normal operating speed of the vehicle.

Conveniently, the hull provides a low-mounting position for the engine, the transmission gearbox, and support for a high speed water propeller so that the height of the center of gravity of the vehicle is reduced.

Figure 2:
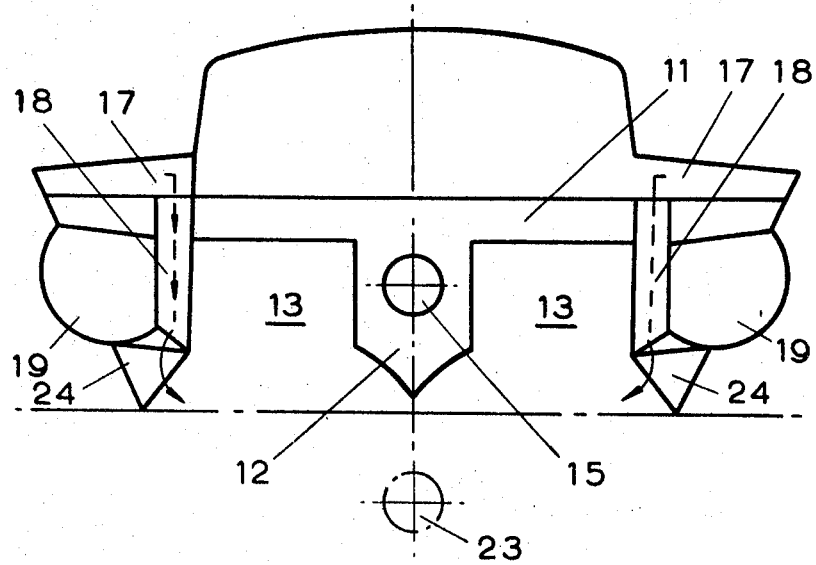

The invention will now be described, by way of example, with reference to the accompanying drawings, in which:

FIG. 1 is a diagrammatic side elevation of a maritime vehicle according to the invention, and FIG. 2 is a lateral section of the vehicle in a vertical plane on the line II-II of FIG. 1.

A maritime vehicle has a rigid horizontal platform 11 and a central rigid hull 12. The platform 11 serves as a space for payload and also acts as the upper boundary to an air cushion area 13.

A lift fan 14 driven by an engine 15 draws air from the atmosphere by way of an air intake 16 and delivers pressurized air through rigid ducts 17 and 18 to the air cushion area 13. The inner wall of the ducts 18 is substantially vertical and acts as part of the lateral boundary of the air cushion area.

Substantially cylindrical, inflated, flexible members 19 are attached by any suitable means to the outer wall of the ducts 18 and the lower wall of the ducts 17. The members 19 act as fenders and may be inflated from a source of pressurized air separate from the vehicle through nonreturn valves.

The central hull 12 is shaped and arranged to have planing characteristics and serves to house the engine 15, a transmission gearbox 20 and supports 21 for a transmission shaft 22 carrying a high-speed water propeller 23.

The hull may be of stepped or chine form.

A plurality of flexible, independent segments 24 are attached to, and depend below, the ducts 18 and fenders 19 to form the lower parts of the air cushion boundary at the sides of the vehicle. The lateral air cushion boundary is completed by longer segments 25 and 26 depending from the platform 11 at the bow and stern respectively. Preferably the segments 25 at the bow and the segments 24 at the sides of the vehicle are open on the air cushion side. The segments 26 at the stern are closed on the air cushion side to avoid scooping up water.

The dotted lines 28 and 29 on FIG. 1 show the shape of the segments 25 and 26 at the bow and stern of the vehicle.

The vehicle is steered by a water rudder 27 mounted in a conventional manner on the hull 12.

In operation, the vehicle is supported in part by the hull and in part by the air cushions, and at normal operating speed the hull produces planing lift. The low position of the engine and other heavy items gives a low center of gravity and hence increased stability in rough seas. Inherent stability is also provided by the shape of the segments.

Further, the long planing hull provides pitch stability. Roll stability is given by the natural stability of the hull, the subdivision of the air cushion area by the hull, and finally by the buoyancy of the fenders. The fenders also give protection to the rigid ducts.

The invention is not to be considered as limited to the embodiment described herein and illustrated in the drawings. Modifications can be made which are within its scope, for example, other forms of marine propulsion may be used, or a combination of marine and air propulsion systems may be employed.

I claim:

1. A maritime vehicle which, during operation, receives support from pressurized air cushions, comprising a rigid platform; a buoyant hull shaped to provide support by planing, said hull being connected to and disposed beneath the rigid platform along the longitudinal centerline of the vehicle; downwardly extending rigid members depending from said platform on laterally opposite sides of said hull and extending longitudinally along at least part of the sides of the platform, such that the rigid members define part of the boundary of an air cushion area beneath said platform, which air cushion area is subdivided by said hull; a flexible skirt assembly including a plurality of independent juxtaposed segments depending downwardly and forming the remainder of the boundary of said cushion area; inflatable members secured to the sides of said rigid members remote from the cushion area for rendering said rigid members buoyant; a lift fan; said rigid members including ducts communicating with said lift fan for conveying pressurized air therefrom to the cushion area; and water propulsion means supported by said hull.

2. A vehicle as claimed in claim 1 wherein the independent juxtaposed segments forming the flexible skirt assembly in the bow and stern areas of the vehicle are relatively long and extend below the bottoms of said rigid members, and wherein said flexible skirt assembly includes shorter segments extending along and below said rigid members.

3. A vehicle as claimed in claim 2 wherein said shorter segments depend at least in part from the rigid members.

4. A vehicle as claimed in claim 2 wherein said shorter segments depend at least in part from said inflatable members.

5. A vehicle as claimed in claim 2 wherein the segments at the bow and sides of the vehicle are open toward the cushion area, and the segments at the stern are closed toward the cushion area.